Sept. 19, 1961 J. SCHWARZÄUGL 3,000,353
BALL POINT PENS
Filed Jan. 9, 1961 3 Sheets-Sheet 1

INVENTOR
Josef SCHWARZÄUGL
By: Eric D. Frankel
PATENT AGENT

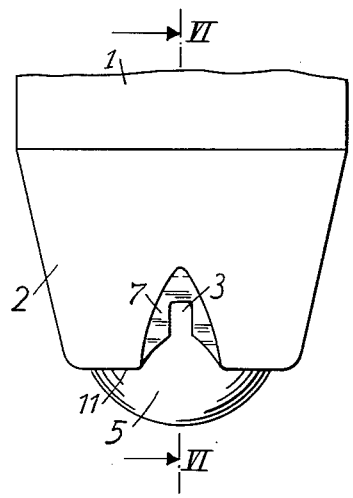
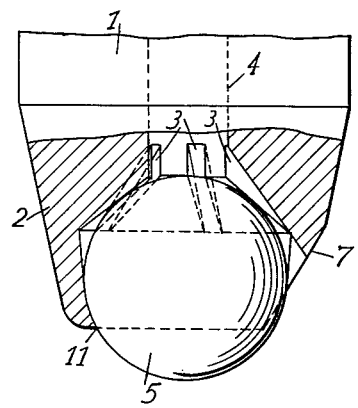
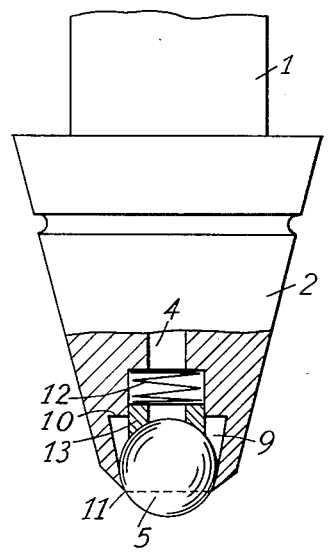
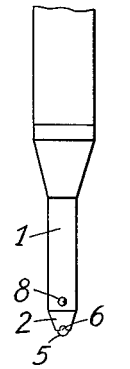
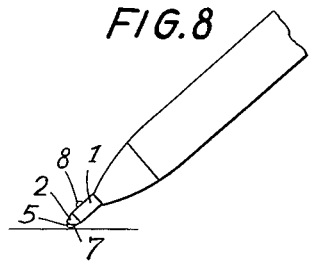

Sept. 19, 1961  J. SCHWARZÄUGL  3,000,353
BALL POINT PENS

Filed Jan. 9, 1961  3 Sheets-Sheet 3

INVENTOR
Josef SCHWARZÄUGL
By: Eric D. Frankel
PATENT AGENT

3,000,353
BALL POINT PENS

Josef Schwarzäugl, Stein, near Nurnberg, Germany, assignor to A. W. Faber-Castell, Stein, near Nurnberg, Germany
Filed Jan. 9, 1961, Ser. No. 81,642
6 Claims. (Cl. 120—42.4)

The present invention relates to improvements in ball-point pens, and is a continuation-in-part limited to the subject matter of my now abandoned applications Serial No. 739,239, filed June 2, 1958, and Ser. No. 748,877, filed July 16, 1958.

In general, ball-point pens consist of a hollow shaft with a tip thereon forming a socket which communicates with an ink paste reservoir within the shaft and a ball partly set into the socket and beaded thereon so as to be capable of rolling on said shaft along a writing surface. The ink paste is generally fed to the ball through a channel provided in the socket thereof, and then is passed along the ball and upon the writing surface. Such a ball-point pen design has the well known disadvantage that the pen stroke which may be produced never varies in thickness. Consequently, it is not possible to produce a person's characteristic handwriting with pen strokes of varying thickness, as may be attained by a regular pen point.

Although it has already been proposed that the thickness of the pen stroke might be varied by mounting the ink paste filler of the pen so as to be longitudinally slidable and also laterally movable within the outer casing, this can also not produce the desired result, since for widening or thickening the stroke of a ball-point pen it is absolutely necessary to increase the amount of ink paste which is picked up and transmitted by the ball while rolling along a writing surface. Even a mere resilient mounting of the ball cannot achieve the desired result since it will by itself not increase the amount of ink paste supplied to the writing surface.

It is an object of the present invention to provide a ball-point pen which permits the characteristics of a person's handwriting to be expressed in a manner similar to that attainable by means of a regular pen point.

It is another object of the invention to achieve this result by a very simple construction which permits the ball-point pen to be easily mass-produced and to be sold at a low price.

These objects may be attained by increasing at least at one point the cross-sectional area of the socket in which the ball is held by being beaded over at the end of the tip, so that an increased flow of ink paste to the ball will be produced at that point. Thus, in writing, when the ball rolls within the socket, it rolls past the enlarged recess in the direction toward the writing surface and thereby picks up a greater amount of ink paste than the amount picked up when rolling in another direction.

Such an enlarged recess may be produced by milling out a channel at the inside of the ball socket, so that this channel communicates with and preferably forms an extension of one of the normal channels which connect the ink paste reservoir with the ball socket. This extension terminates into the lower edge of the beading holding the ball within the socket and thus forms a discharge opening therein.

A modification of the invention of forming at one point an enlarged discharge opening through which the ink paste can flow more freely toward the outer portion of the ball may be attained by grinding off the outside of the ball socket at one point thereof, and preferably to such an extent that the groove thus cut will extend into the lower end of one of the regular ink paste channels.

A further modification of the invention consists in forming an internally enlarged recess within the socket which extends all around the ball. In this event, the recess is preferably of a frusto-conical shape with the base of the hollow cone facing upwardly and away from the ball. The ball will then be held in position within the socket by the pressure of a small spring. If, in writing, a greater downward pressure is exerted upon the ball-point pen, the ball will be depressed into its socket against the action of the spring and will thereby increase the size of the discharge opening through which the ink paste can pass upon the ball.

The above objects may also be attained by making the contact surface between the ball and the socket, in which the ball is held by a beading, at least at one point of a length different from the length of the contact surface at the other points, as seen in the direction from the edge of the beading to the point at which the ink paste flows to the ball. Such provision will result in a change in the resistance which the ink flow will incur at the different points of the contact surface. Since this resistance will be smallest at those points of the socket where the contact surface with the ball has the shortest length, the ball rolling along the writing surface will take along more ink paste at these points, and will transfer the same to the writing surface, than if the rolling movement occurs along a point which produces a greater resistance to the ink flow. This will permit pen strokes to be made as fine as a hair line or as heavy as used for shading, depending upon the position in which the ball-point pen is held.

According to another feature of the present invention, it is possible to produce lines of different degrees of thickness or also of a varying thickness by extending the channels within the socket, through which the ink paste is conducted to the ball, to different points which are disposed at different distances from the edge of the beading. At those points where the channels come closest to the edge of the beading, the ink flow will find the least resistance. If the ball is rolled in the proper direction, it will thus transfer from such a point a larger quantity of ink paste to the writing surface than if it rolls along a point of the socket where the distance between the channel and the edge of the beading is greater. According to the invention, the ink feeding channels are preferably extended closest to the edge of the beading at those points where the contact surface between the ball and the socket is also the smallest.

Additional objects and advantages of the present invention will become apparent upon consideration of the following description when taken in conjunction with the accompanying drawings, in which:

FIGURE 5 shows a side view of the lower end portion of a ball-point pen according to a modification of the invention with a groove ground into the outer surface of the tip of the shaft and extending into one of the normal ink channels within the ball socket;

FIGURE 6 shows a cross section taken along line VI—VI of FIGURE 5;

FIGURE 7 shows a cross sectional view of another modification of the invention;

FIGURE 8 shows a ball-point pen according to FIGURES 1 to 6 in the writing position;

FIGURE 9 shows a side view of FIGURE 8, as seen from the left side thereof;

Figure 1:
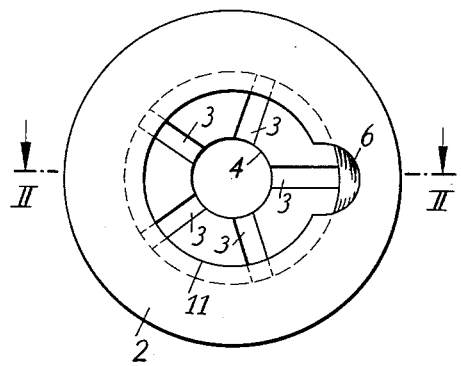
FIGURE 1 shows a view upon the lower end of a ball-point pen according to the invention in which the ball is omitted.
Figure 3:
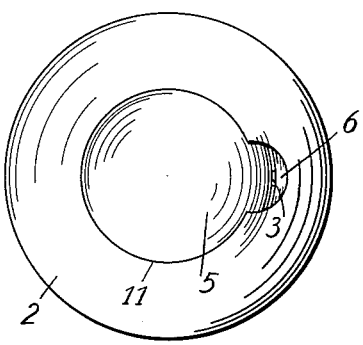
FIGURE 3 shows an end view similar to FIGURE 1 but also with the ball inserted into its socket.
Figure 2:
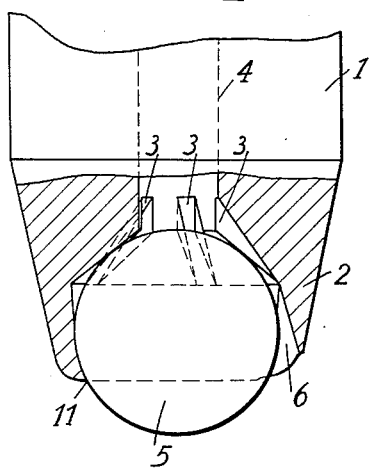
FIGURE 2 shows a cross section taken along line II—II of FIGURE 1, but with the ball inserted into its socket.
Figure 4:
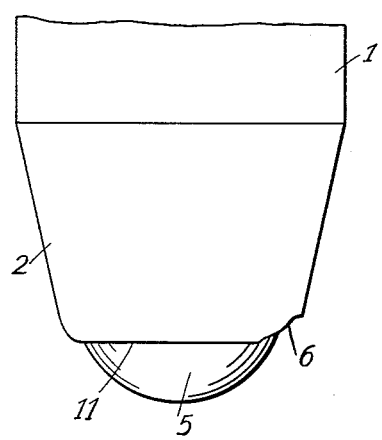
FIGURE 4 shows a side view of the lower end portion of the ball point pen according to FIGURES 1 to 3.

Referring to FIGURES 1 to 9 of the drawings, shaft 1 of the ball point filler has a tip 2 forming a ball socket in which ink channels 3 are provided in the usual manner for allowing the ink paste to flow from the paste reservoir 4 to the ball 5 which is held within the socket by the lower end 11 of tip 2 being beaded inwardly.

In the first embodiment of the invention, as illustrated in FIGURES 1 to 4, one of the ink channels 3 is extended toward the lower end of tip 2 by an enlarged channel 6 which is preferably formed by milling and which permits an increased flow of ink paste at this point.

A modification of the invention is illustrated in FIGURES 5 and 6, in which a groove 7 is ground or cut into the lower end of tip 2 so as to extend into the end of one of the ink channels 3, thus permitting an increased flow of ink paste to the surface of the ball 5.

FIGURE 8 illustrates another advantage which will be attained especially with the embodiment according to FIGURES 5 and 6. Due to the fact that the portion 7 is ground or cut away, it is possible to write with the ball point pen according to the invention in a much more downwardly inclined position than with the usual type of a ball point pen, so that the angle towards the writing surface will amount to only about 40°, as compared with about 55° at which the conventional ball point pen has to be held in writing. This also applies to a slightly smaller extent to the first embodiment of the invention, as will be evident from FIGURES 2 and 4.

Since in the embodiments according to FIGURES 1 to 6, the enlarged discharge opening 6 or 7 is disposed at a particular point of the circumference of the lower end of tip 2, it is advisable to provide a suitable mark 8 to indicate the position of this point in writing, for example, at a point diametrically opposite thereto on shaft 1.

Another preferred embodiment of the invention is illustrated in FIGURE 7, in which tip 2 of the ball point pen is provided with a conical recess 9, the base 10 of which faces in the direction towards shaft 1. A washer 13 with a spherical face at one side rests on ball 5, while a coil spring 12 acts upon washer 13 and presses ball 5 normally into engagement with the beaded edge 11 at the lower end of tip 2. It will be evident from the drawing that the greater the downward pressure which a person exerts in writing upon the ball point pen, the more deeply ball 5 will be depressed into its conical socket 9 against the action of spring 12, and the less will be the wiping action of the beaded edge 11 upon ball 5. Consequently, while a normal supply of ink paste for a fine pen stroke will be transferred by the projecting portion of ball 5 upon the writing surface when only a slight downward pressure is exerted upon the pen, a greater pressure thereon will produce a greater supply of ink paste upon the projecting portion of ball 5, resulting in a thicker heavier pen stroke.

Figure 10:
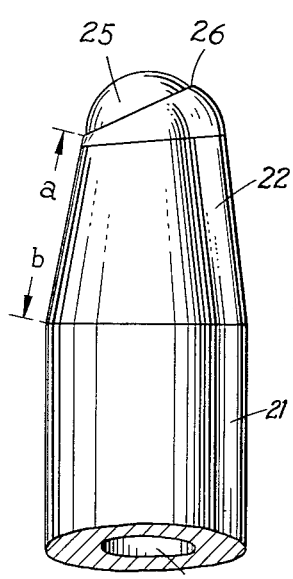
FIGURE 10 shows an elevation of a ball point filler according to the invention with a ball fitted into the socket.
Figure 11:
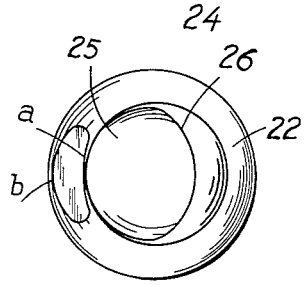
FIGURE 11 shows a plan view of the ball point filler according to FIGURE 10.
Figures 13, 14:
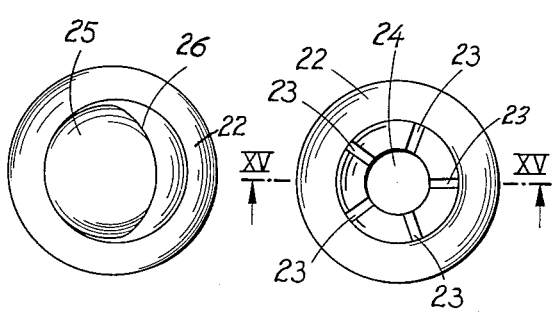
FIGURE 13 shows a plan view of the ball point filler according to FIGURE 12.
FIGURE 14 shows a plan view of a slightly modified ball point filler according to the invention, but without the ball.

Referring next to FIGURES 10 to 15 of the drawings, the hollow shaft 21 of the ball point filler carries the ball point tip 22 which forms a ball socket in which a plurality of channels 23 is provided in the usual manner for conducting the ink paste from its reservoir 24 into the socket and to the ball 25 which is held within the socket by a beading 26. In order to be able to tilt the pen considerably while writing, the outside of the tip is preferably ground off along the area a—b, as shown in FIGURES 10 and 11.

Figure 12:
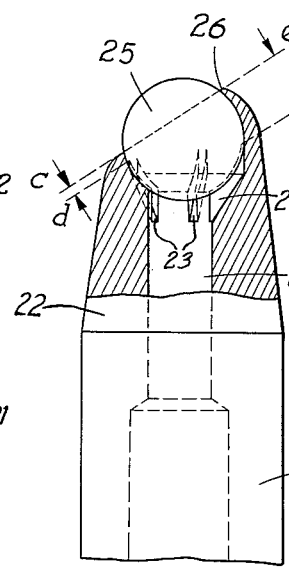
FIGURE 12 shows a similar elevation, but partly in cross section, of a ball point filler similar to that shown in FIGURE 10.

FIGURE 12 illustrates that channels 23 through which the ink paste is fed from the reservoir 24 to ball 25 in the tip 22 extend to different distances from the edge of beading 26, and that the distance between the edge of beading 26 from the forward end of the channel 23 at the left side of FIGURE 12 is smaller than the distances between this edge and the forward ends of the other channels. This distance c—d only amounts to a fraction of the distance e—f between the end of the channel 23 at the right side of FIGURE 12 and the edge of beading 26. Consequently, the ink flow will meet a different resistance along the different points of the socket. When the ball 25 rolls in a clockwise direction along the distance c—d, a greater quantity of ink paste will be transferred to the writing surface than if it rolls in a counterclockwise direction along the distance e—f of the contact surface of the socket.

Figure 15:
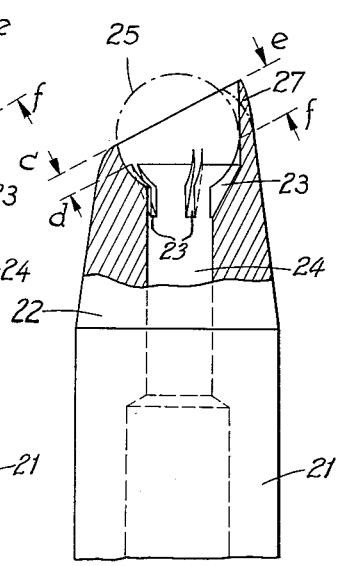
FIGURE 15 shows a cross section taken along line XV—XV of FIGURE 14.

FIGURE 15 illustrates the manner of forming the beading 26. The edge portion 27 of tip 22 is at first made straight, as shown by the full lines, to permit ball 25 to be easily inserted into the socket. Thereafter, edge portion 27 is bent over to the position shown in dot-dash lines. In FIGURE 15, the distances c—d and e—f again have a different length, although this difference is not quite as great as in FIGURE 12. Thus, by varying the minimum and maximum distances between the front ends of the different ink channels and the edge of the beading, and by thus varying the extent of the contact surfaces between the ends of the respective channels and the edge of the beading, the ball point pens may be designed for different ranges of line thicknesses.

It will thus be evident that, depending upon the position in which the ball point pen is held and the direction of rotation of the ball, and also depending upon whether the position of the different ink channels relative to the writing surface is changed in the course of writing or of drawing lines, it will be possible to draw lines each of a uniform thickness and with thicknesses differing from each other, or to draw or write with lines of varying thicknesses and thus to obtain pen strokes similar to those obtainable, for example, by means of a fountain pen with liquid ink.

It will be understood that the above description of the present invention is susceptible to various modifications, changes and adaptations, and the same are intended to be comprehended within the meaning and range of equivalents of the appended claims.

I claim:

1. A ball point pen comprising a hollow shaft containing an ink paste reservoir therein, said shaft being formed at one end thereof with a socket having a lip, said socket forming a spherical seat for a ball rotatably mounted in said socket and partly projecting therefrom beyond said lip, said shaft being formed with a plurality of longitudinal channels extending from said ink paste reservoir to said socket, only one of said channels terminating at one end thereof at said lip of said socket with each of the remaining channels terminating at one end thereof at a point within said socket and spaced from said lip, whereby more ink paste is supplied to that portion of said lip at which said one end of said one longitudinal channel terminates than is supplied to the remainder of said lip, thereby producing a thickening of the stroke at said lip portion.

2. A ball point pen comprising a hollow shaft containing an ink paste reservoir therein, said shaft being formed at one end thereof with a socket having a lip, said socket forming a spherical seat for a ball rotatably mounted in said socket and partly projecting therefrom beyond said lip, said shaft being formed with a plurality of longitudinal channels extending from said ink paste reservoir to said socket, only one of said channels terminating at one end thereof at said lip of said socket with each of the remaining channels terminating at one end thereof at a point within said socket and spaced from said lip, said one longitudinal channel being bounded by a surface which is inclined to the longitudinal axis of the pen, whereby more ink paste is supplied to that portion of said lip at which said one end of said one longitudinal channel terminates than is supplied to the remainder of said lip, whereby producing a thickening of the stroke at said lip portion.

3. A ball point pen comprising a hollow shaft containing an ink paste reservoir therein, said shaft being formed at one end thereof with a socket having a lip, said socket forming a spherical seat for a ball rotatably mounted in said socket and partly projecting therefrom beyond said lip, said shaft being formed with a plurality of longitudinal channels extending from said ink paste reservoir to said socket, only one of said channels terminating at one end thereof at said lip of said socket with each of the remaining channels terminating at one end thereof at a point within said socket and spaced from said lip, whereby more ink paste is supplied to that portion of said lip at which said one end of said one longitudinal channel terminates than is supplied to the remainder of said lip, thereby producing a thickening of the stroke at said lip portion, said shaft carrying an indicating mark which is diametrically opposite said portion of said lip.

4. A ball point pen comprising in combination with a hollow shaft containing an ink paste reservoir, and having a tip forming a socket, a ball rotatably mounted in said socket and partly projecting therefrom, and held within said socket by a beading at the front end of said tip, said socket having a circularly continuous contact surface between a ball part and the inside of said socket and a plurality of ink paste feeding channels extending from said ink paste reservoir to said ball part contacting said socket, said ink paste feeding channels extending in said contact surface of said socket to points disposed at different distances from the front edge of said beading adapted to cause transferring of ink paste from the ink paste reservoir to the ball and from the ball to the writing surface during writing operation with different resistance and different quantity dependent upon said distances of said front beading edge from the corresponding ink paste channels.

5. A ball point pen having a hollow shaft containing an ink paste reservoir, a tip forming a socket, a ball rotatably mounted in said socket, and partly projecting therefrom, and held within said socket by a beading at the front end of said tip, said socket having a circularly continuous contact surface between a part of said ball and the inside of said socket and a plurality of ink paste feeding channels extending from said ink paste reservoir to said ball part contacting said socket during rotation of said ball for writing operation on a writing surface, said ink paste feeding channels extending in said contact surface of said socket to points disposed at different distances from the front edge of said beading adapted to cause transferring of ink paste from the ink paste reservoir to the ball and from the ball to the writing surface with different resistance and different quantity dependent upon said different distances of said front beading edge from the corresponding ink paste channels.

6. A ball point pen having a hollow shaft containing an ink paste reservoir, a tip forming a socket, a ball rotatably mounted in said socket and partly projecting therefrom, and held within said socket by a beading at the front end of said tip, the front edge of said beading being inclined to the longitudinal central line of said tip and said shaft, said socket having a circularly continuous contact surface between a part of said ball and the inside of said socket which surface is at least at one point smaller than at other points, said socket further having a plurality of ink paste feeding channels extending from said ink paste reservoir to said ball part contacting said socket during rotation of said ball for writing operation on a writing surface, said ink paste feeding channels extending in said contact surface of said socket to points disposed at different distances from the front edge of said beading, the ink paste feeding channels with shorter distance from the front beading edge being disposed at points of smaller contact surface between the ball and the socket inside, adapted to cause transferring of ink paste from the ink paste reservoir to the ball and from the ball to the writing surface at the points of smaller contact surface between the ball and the socket inside with smaller resistance and larger quantity than at the points of larger contact surfaces between said ball and said socket inside.

References Cited in the file of this patent

UNITED STATES PATENTS

| | | |
|---|---|---|
| 538,492 | Askew | Apr. 30, 1895 |
| 1,839,160 | Nissen | Dec. 29, 1931 |
| 2,518,770 | Gibbs | Aug. 15, 1950 |
| 2,564,755 | Fehling | Aug. 21, 1951 |
| 2,813,513 | Seyer | Nov. 19, 1957 |

FOREIGN PATENTS

| | | |
|---|---|---|
| 259,852 | Switzerland | July 1, 1949 |
| 498,629 | Belgium | Apr. 11, 1951 |
| 1,043,600 | France | June 17, 1953 |
| 496,361 | Italy | July 12, 1954 |
| 738,646 | Great Britain | Oct. 19, 1955 |
| 81,910 | Holland | June 15, 1956 |
| 1,158,510 | France | Jan. 28, 1958 |

UNITED STATES PATENT OFFICE
CERTIFICATE OF CORRECTION

Patent No. 3,000,353            September 19, 1961

Josef Schwarzäugl

It is hereby certified that error appears in the above numbered patent requiring correction and that the said Letters Patent should read as corrected below.

In the heading to the printed specification, between lines 6 and 7, insert the following:

Claims priority, application Germany June 12, 1957

Signed and sealed this 13th day of February 1962.

(SEAL)
Attest:

ERNEST W. SWIDER
Attesting Officer

DAVID L. LADD
Commissioner of Patents